H. C. HAINES.
GATE.
APPLICATION FILED JULY 30, 1919.

1,334,998.

Patented Mar. 30, 1920.

WITNESSES

INVENTOR
H. C. HAINES,
BY
ATTORNEYS

UNITED STATES PATENT OFFICE.

HENRY C. HAINES, OF GENESEO, ILLINOIS.

GATE.

1,334,998.

Specification of Letters Patent. Patented Mar. 30, 1920.

Application filed July 30, 1919. Serial No. 314,189.

*To all whom it may concern:*

Be it known that I, HENRY C. HAINES, a citizen of the United States, and a resident of Geneseo, in the county of Henry and State of Illiniois, have made certain new and useful Improvements in Gates, of which the following is a specification.

My invention relates to gates, and particularly to gate latches.

A purpose of my invention is the provision of a gate latch which allows the opening of a gate only when the gate is raised above its normal height and the latch actuated while in its elevated position, whereby the accidental or intentional opening of a gate by an animal is prevented.

It is also a purpose of my invention to provide an actuating lever for the latch which when in active position serves as a support for the gate to prevent sagging of the same.

I will describe one form of gate and one form of latching device embodying my invention and will then point out the novel features in claims.

In the accompanying drawings.

Similar reference characters refer to similar parts in each of the views.

Figure 2:
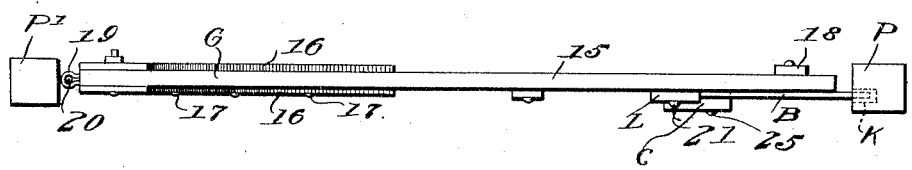
Fig. 2 is a top plan view of Fig. 1.

Referring specifically to the drawings, G designates a gate of the horizontally swinging type, which comprises horizontally disposed boards or members 15 connected at one of their ends between side members 16 by bolts 17. The opposite ends of the members 15 are connected by a vertically disposed beam 18, which as shown in Fig. 2, is secured to members 15 at one side only. The gate G is mounted for horizontal swinging movement in either direction from a latching post P by staples 19 fixed to the members 15 and working on pins 20 carried by a post P'. The post P is recessed to provide a keeper K for receiving the end of my improved form of latch.

Figure 1:
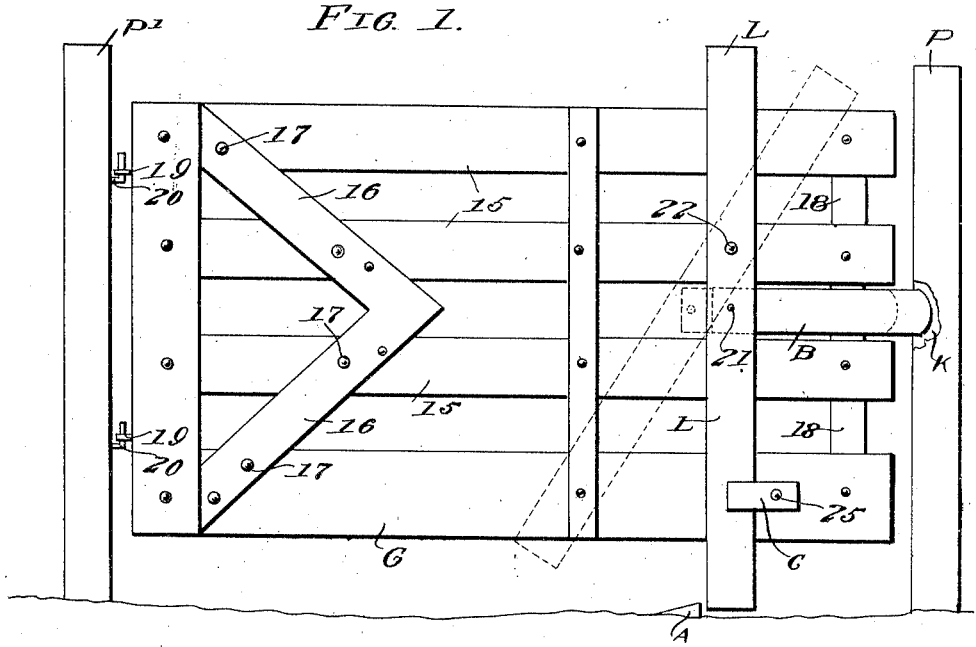
Figure 1 is a view showing in side elevation one form of gate and one form of latching device embodying my invention.

As shown in Fig. 1, the latching device which forms the subject-matter of my invention, comprises a bar B disposed between and parallel to a pair of the members 15, with its outer end rounded so as to readily slide into the keeper K. The bar B is pivotally supported upon an operating lever L by a bolt 21, while the lever L is pivotally supported on one of the members 15 by a bolt 22 at a point above the pivot 21 so that when locking the lever is rocked in one direction or the other, the latch bar is moved horizontally in one direction or the other. With the lever L in normal position, the latch bar B occupies a latching position, as shown in Fig. 1, and is limited in its forward movement by a cleat C which is secured on the gate by a bolt 25, as shown. However, when the lever L is swung to the position shown in dash lines in Fig. 1, the bar B is retracted from the keeper K, thus permitting the gate to be opened.

As shown in Fig. 1, the lever L is of such a length that when it occupies an active or vertical position, its lower end abuts the ground beneath the gate and thus supports the latter in open or closed position, against sagging. It will be seen, therefore, that the lever L performs the double function of actuating the latch bar B and supporting the gate against sagging when in any position.

To lock the gate in closed position, I provide a projection A such as a stone or other obstacle, which is partially embedded in the ground adjacent the lever L, so that when the latch has been closed, it will prevent movement of the lever to releasing position, unless the projection is removed or the gate lifted bodily so that the lever can be swung to releasing position. It will be obvious from the foregoing that it is practically impossible for an animal to open the gate after it has been once latched.

Although I have herein shown and described only one form of gate and one form of latching device embodying my invention, it is to be understood that various changes and modifications may be made herein without departing from the spirit of the invention, and the spirit and scope of the appended claims.

Having described my invention, what I claim is:—

1. A latch for swinging gates, comprising a lever adapted to be pivoted to a gate so as to normally occupy a vertical position, and a latch bar pivoted to the lever at a point below the pivot point of the lever, said lever being of a length sufficient to engage the ground when in vertical position to support the gate against sagging.

2. In combination, a horizontal swinging gate, a lever pivoted on the gate to normally occupy a vertical position so as to support the gate against sagging, and a latch bar on the gate and connected to the lever for movement thereby.

3. In combination, a horizontal swinging gate, a lever pivoted on the gate to normally occupy a vertical position and of a length sufficient to support the gate against sagging, a latch bar on the gate and connected to the lever for movement thereby, a keeper for receiving the latch, and a projection disposed beneath the gate, when the latter is in closed position and in the path of the lever.

4. In combination, a horizontal swinging gate, a lever pivoted on the gate, a latch bar pivoted to the lever, a keeper for receiving the latch bar, and means for locking the lever in vertical position when the gate is closed.

HENRY C. HAINES.